US012711942B2

(12) United States Patent
Pan et al.

(10) Patent No.: US 12,711,942 B2
(45) Date of Patent: Aug. 18, 2026

(54) CROSS-SPEAKER STYLE TRANSFER SPEECH SYNTHESIS

(71) Applicant: Microsoft Technology Licensing, LLC, Redmond, WA (US)

(72) Inventors: Shifeng Pan, Redmond, WA (US); Lei He, Redmond, WA (US); Chunling Ma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 742 days.

(21) Appl. No.: 17/799,031

(22) PCT Filed: Feb. 1, 2021

(86) PCT No.: PCT/US2021/015985

§ 371 (c)(1),
(2) Date: Aug. 11, 2022

(87) PCT Pub. No.: WO2021/183229

PCT Pub. Date: Sep. 16, 2021

(65) Prior Publication Data

US 2023/0081659 A1 Mar. 16, 2023

(30) Foreign Application Priority Data

Mar. 13, 2020 (CN) ......................... 202010177212.2

(51) Int. Cl.

*G10L 13/047* (2013.01)
*G10L 13/033* (2013.01)
*G10L 13/08* (2013.01)

(52) U.S. Cl.

CPC .......... *G10L 13/047* (2013.01); *G10L 13/033* (2013.01); *G10L 13/08* (2013.01)

(58) Field of Classification Search

CPC ...... G10L 13/047; G10L 13/033; G10L 13/08
See application file for complete search history.

(56) References Cited

U.S. PATENT DOCUMENTS

2020/0082806 A1 3/2020 Kim et al.
2021/0097976 A1* 4/2021 Chicote ................ G06N 3/0442

FOREIGN PATENT DOCUMENTS

CN 110634466 A 12/2019
CN 109147758 B 2/2020

(Continued)

OTHER PUBLICATIONS

Yuxuan Wang, Daisy Stanton, Yu Zhang, RJ Skerry-Ryan, Eric Battenberg, Joel Shor, Ying Xiao, Fei Ren, Ye Jia, Rif A. Saurous, "Style Tokens: Unsupervised Style Modeling, Control and Transfer in End-to-End Speech Synthesis", Mar. 23, 2018, arXiv:1803.09017v1. (Year: 2018).*

(Continued)

*Primary Examiner* — Pierre Louis Desir
*Assistant Examiner* — Daniel W Chung
(74) *Attorney, Agent, or Firm* — Schwegman Lundberg & Woessner, P.A.

(57) ABSTRACT

This disclosure provides methods and apparatuses for training an acoustic model which is for implementing cross-speaker style transfer and comprises at least a style encoder. Training data may be obtained, which comprises a text, a speaker ID, a style ID and acoustic features corresponding to a reference audio. A reference embedding vector may be generated, through the style encoder, based on the acoustic features. Adversarial training may be performed to the reference embedding vector with at least the style ID and the speaker ID, to remove speaker information and retain style information. A style embedding vector may be generated, through the style encoder, based at least on the reference embedding vector being performed the adversarial training. Predicted acoustic features may be generated based at least on a state sequence corresponding to the text, a speaker (Continued)

embedding vector corresponding to the speaker ID, and the style embedding vector.

20 Claims, 6 Drawing Sheets

(56) References Cited

FOREIGN PATENT DOCUMENTS

| | | | |
|---|---|---|---|
| CN | 107767856 | B | 11/2021 |
| CN | 110264991 | B | 12/2023 |
| GB | 2572020 | A | 9/2019 |
| WO | 2019222591 | A1 | 11/2019 |
| WO | 2020027619 | A1 | 2/2020 |

OTHER PUBLICATIONS

Matt Whitehill, Shuang Ma, Daniel McDuff, Yale Song, "Multi-Reference Neural TTS Stylization with Adversarial Cycle Consistency" , Oct. 25, 2019, arXiv:1910.11958v1 (Year: 2019).*
Ya-Jie Zhang, Shifeng Pan, Lei He, Zhen-Hua Ling, "Learning Latent Representations for Style Control and Transfer in End-to-End Speech Synthesis", Feb. 14, 2019, arXiv:1812.04342v2 (Year: 2019).*
Yanyao Bian, Changbin Chen, Yongguo Kang, Zhenglin Pan, "Multi-reference Tacotron by Intercross Training for Style Disentangling, Transfer and Control in Speech Synthesis", Apr. 4, 2019, arXiv:1904.02373v1 (Year: 2019).*
D.-R. Liu, C.-Y. Yang, S.-L. Wu and H.-Y. Lee, "Improving Unsupervised Style Transfer in end-to-end Speech Synthesis with end-to-end Speech Recognition," 2018 IEEE Spoken Language Technology Workshop (SLT), Athens, Greece, 2018, pp. 640-647, doi: 10.1109/SLT.2018.8639672. (Year: 2018).*
Ye Jia, Yu Zhang, Ron J. Weiss, Quan Wang, Jonathan Shen, Fei Ren, Zhifeng Chen, Patrick Nguyen, Ruoming Pang Ignacio, Lopez Moreno, Yonghui Wu, "Transfer Learning from Speaker Verification to Multispeaker Text-To-Speech Synthesis", Jan. 2, 2019, arXiv:1806.04558v4. (Year: 2019).*
Qian, K., Zhang, Y., Chang, S., Yang, X. Hasegawa-Johnson, M. "AutoVC: Zero-Shot Voice Style Transfer with Only Autoencoder Loss", 2019, Proceedings of the 36th International Conference on Machine Learning, in Proceedings of Machine Learning Research 97:5210-5219 (Year: 2019).*
Arik, et al., "Deep Voice 2: Multi-Speaker Neural Text-to-Speech", In Proceedings of 31st Conference on Neural Information Processing Systems, Dec. 4, 2017, 9 Pages.
Gardiner, Nicholas, "Facial re-enactment, speech synthesis and the rise of the Deepfake", In thesis of Edith Cowan University, 2019, 79 Pages.
Haque, et al., "Conditional End-to-End Audio Transforms", In repository of arXiv:1804.00047v2, Jun. 7, 2018, 5 Pages.
Lee, et al., "Emotional End-to-End Neural Speech synthesizer", In repository of arXiv:1711.05447v2, Nov. 28, 2017, pp. 1-5.
"International Search Report and Written Opinion Issued in PCT Application No. PCT/US21/015985", Mailed Date: May 19, 2021, 12 Pages.
Whitehill, et al., "Multi-Reference Neural TTS Stylization with Adversarial Cycle Consistency", In repository of arXiv:1910.11958v1, Oct. 25, 2019, 5 Pages.
Zhang, et al., "Learning Latent Representations for Style Control and Transfer in End-to-end Speech Synthesis" In Proceedings of IEEE International Conference on Acoustics, Speech and Signal Processing, May 12, 2019, pp. 6945-6949.
Wang, et al., "Style Tokens: Unsupervised Style Modeling, Control and Transfer in End-to-End Speech Synthesis", In Proceedings of the 35th International Conference on Machine Learning, Jul. 3, 2018, pp. 5180-5189.
Bian, et al., "Multi-reference Tacotron by Intercross Training for Style Disentangling, Transfer and Control in Speech Synthesis", In repository of arXiv:1904.02373v1, Apr. 4, 2019, 5 Pages.
EPO Notification Rule 71(3) received in European Application No. 217078617, mailed on Jul. 23, 2024, 7 pages.
Notice of Grant received for Chinese Application No. 202010177212.2, mailed on Jan. 4, 2024, 9 pages (English Translation Provided).
Decision to grant a European patent pursuant to Article 97(1) received in European Application No. 21707861.7, mailed on Nov. 14, 2024, 02 pages.

* cited by examiner

CROSS-SPEAKER STYLE TRANSFER SPEECH SYNTHESIS

CROSS-REFERENCE TO RELATED APPLICATION

This application is a U.S. National Stage Filing under 35 U.S.C. 371 of International Patent Application Serial No. PCT/US2021/015985, filed Feb. 1, 2021, and published as WO 2021/183229 A1 on Sep. 16, 2021, which claims priority to Chinese Application No. 202010177212.2, filed Mar. 13, 2022, which applications and publication are incorporated herein by reference in their entirety.

BACKGROUND

Text-to-speech (TTS) synthesis is intended to generate a corresponding speech waveform based on a text input. The TTS synthesis is widely applied for speech-to-speech translation, voice customization for specific users, role play in stories, etc. Conventional TTS systems may predict acoustic features based on a text input, and further generate a speech waveform based on the predicted acoustic features.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for training an acoustic model. The acoustic model may be for implementing cross-speaker style transfer and comprise at least a style encoder.

In some embodiments, training data may be obtained, the training data comprising a text, a speaker identity (ID), a style ID and acoustic features corresponding to a reference audio. A reference embedding vector may be generated, through the style encoder, based on the acoustic features. Adversarial training may be performed to the reference embedding vector with at least the style ID and the speaker ID, to remove speaker information and retain style information. A style embedding vector may be generated, through the style encoder, based at least on the reference embedding vector being performed the adversarial training. Predicted acoustic features may be generated based at least on a state sequence corresponding to the text, a speaker embedding vector corresponding to the speaker ID, and the style embedding vector.

In some other embodiments, training data may be obtained, the training data at least comprising a first text, a first speaker ID, and a second text, a second speaker ID and style reference acoustic features corresponding to a style reference audio. First transfer acoustic features may be generated, through the acoustic model, based at least on the first text, the first speaker ID, and a first transfer style embedding vector, wherein the first transfer style embedding vector is generated by the style encoder based on the style reference acoustic features. Second transfer acoustic features may be generated, through a duplicate of the acoustic model, based at least on the second text, the second speaker ID and a second transfer style embedding vector, wherein the second transfer style embedding vector is generated by a duplicate of the style encoder based on the first transfer acoustic features. Cyclic reconstruction loss may be calculated with the style reference acoustic features and the second transfer acoustic features.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
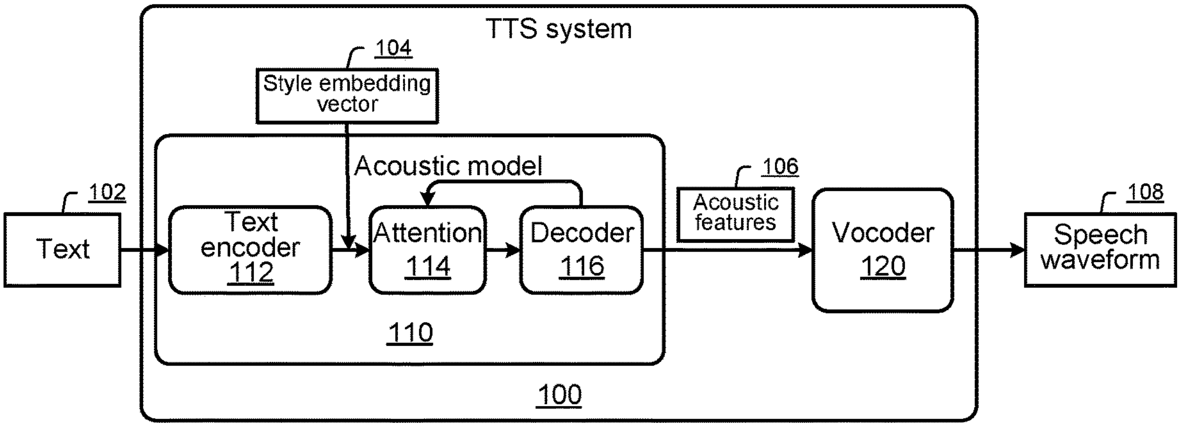
FIG. 1 illustrates an exemplary conventional style transfer TTS system.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

A conventional TTS system may include an acoustic model and a vocoder. The acoustic model may predict acoustic features, e.g., mel-spectrum sequence, based on a text input. The vocoder may convert the predicted acoustic features into a speech waveform. Generally, the acoustic model will determine speech characteristics in terms of prosody, timbre, etc. The acoustic model may be speaker-dependent, e.g., trained with speech data of a target speaker. The trained TTS system may convert a text input into speech having similar timbre, prosody, etc. with the target speaker. In some cases, it may be desirable to synthesize speech in a specific speaking style, e.g., in an approach of newscaster, reading, storytelling, happy emotion, sad emotion, etc.

Herein, “style” refers to the approach of uttering or speaking, which may be characterized by, e.g., prosody, timbre change, etc.

A straightforward way is to collect audio data of a target speaker in a target style, and train the TTS system with these audio data. The trained TTS system may perform speech synthesis in the target speaker’s voice and in the target style.

Another way is to perform style transfer in speech synthesis. A style embedding vector corresponding to a target style may be obtained and introduced into the TTS system, so as to guide the synthesized speech to the target style. The style transfer may include single-speaker style transfer and cross-speaker style transfer.

In the single-speaker style transfer, audio data of a target speaker in a plurality of styles may be collected for training the TTS system. The trained TTS system may perform speech synthesis in the target speaker’s voice and in different target styles.

In the cross-speaker style transfer, audio data of a plurality of speakers in a plurality of styles may be collected for training the TTS system. The trained TTS system may perform speech synthesis in any target speaker’s voice and in any target style. This will significantly enhance the style imposing capability of the TTS system. Style embedding vector is a key influencing factor in the cross-speaker style transfer. In one aspect, techniques such as Global Style Token (GST), etc. have been proposed to extract a style embedding vector. However, these technologies cannot guarantee sufficient accuracy and robustness. In another aspect, since the style embedding vector is learned from collected multi-speaker multi-style audio data during training, it likely contains speaker information or content information, which will reduce the quality of synthesized speech in terms of prosody, timbre, etc. In yet another aspect, during the training of the TTS system, a text input, a speaker identity and an audio, which act as training data, are usually paired, e.g., the audio is spoken by the speaker and content spoken by the speaker is the text input. Therefore, in the synthesis stage or the stage of applying the TTS system, when it is desired to synthesize speech for a certain target text in a voice of speaker A, if an audio or acoustic features of speaker B for another text different from the target text is used as style reference, the quality of synthesized speech will be low. This is because paired training data is used during training, and such unpaired situation has not been considered. Although it is proposed in some existing TTS systems that unpaired inputs may be used during training, wherein an unpaired input may refer to that, e.g., an input audio is for a text different from a text input, since unpaired prediction results generated for the unpaired inputs usually do not have ground truth labels or effective constraints, it may be still unable to train a high-quality TTS system effectively.

Embodiments of the present disclosure propose a scheme for effectively training an acoustic model in a TTS system, so as to predict high-quality acoustic features. In particular, a style encoder in the acoustic model may be well trained to facilitate to implement cross-speaker style transfer. TTS including this acoustic model will be able to implement style transfer speech synthesis with higher quality.

In some embodiments of the present disclosure, it is proposed to apply adversarial training to the style encoder during the training of the acoustic model, so as to improve the quality of style embedding vectors.

An adversarial training mechanism such as Domain Adversarial Training (DAT) may be adopted for retaining as much pure style information as possible in style embedding vectors generated by the style encoder, and for removing as much speaker information, content information, etc., as possible from the style embedding vectors. When performing cross-speaker style transfer speech synthesis, it is expected that the timbre of a synthesized speech is the timbre of a target speaker. Through the DAT, a style embedding vector may be prevented from containing information of a reference speaker in a style reference audio, e.g., timbre information of the reference speaker, etc., thereby preventing the timbre of a synthesized speech from being undesirably changed, e.g., becoming a mixture of the timbres of the target speaker and the reference speaker. Accordingly, audio fidelity of synthesized speech may be improved. In other words, a speaking style may be effectively transferred to the target speaker, and meanwhile, a synthesized speech may have a timbre and audio fidelity similar with the target speaker’s own voice. In an implementation, in the DAT, a style classifier and a speaker classifier which connects to a gradient reversal layer may be applied for retaining style information and removing speaker information in a style embedding vector.

The style encoder may adopt, e.g., a Variational Auto Encoder (VAE), a Gaussian Mixture Variational Auto Encoder (GMVAE), etc. As compared with the GST, the VAE is more suitable for speech generation and has better performance. Through the VAE, a latent variable having Gaussian distribution may be inferred from a style reference audio in a variational manner, and the Gaussian distribution of the latent variable may be further used for obtaining a style embedding vector, wherein the latent variable may be regarded as a simplified inherent factor that leads to a relevant speaking style. The GMVAE is an extension of the VAE. Through adopting the GMVAE and multi-style audio data in the training, a set of Gaussian distributions may be learned, which represent a Gaussian mixture distribution of latent variables that lead to each speaking style. The latent variables obtained through the VAE or the GMVAE have Gaussian distribution or Gaussian mixture distribution respectively, which are in low dimensions, and retain more prosody-related information and contain, e.g., less content information, speaker information, etc. A style embedding vector may correspond to a prior distribution or a posterior distribution of a latent variable having Gaussian distribution or Gaussian mixture distribution. In particular, a prior distribution of a latent variable is a good and robust representation of a speaking style, therefore higher quality and more stable style transfer may be implemented through adopting a prior distribution to obtain a style embedding vector. In one aspect, the prior distribution may be speaker-independent, e.g., one style has a global prior distribution. In another aspect, the prior distribution may also be speaker-dependent, e.g., each speaker’s style has a corresponding prior distribution. When it is desired to transfer a style of a specific reference speaker to a target speaker, it would be advantageous to rely on a prior distribution of the speaker. Through training, a prior distribution learned for each style and/or each reference speaker may be a good and robust representation of style embedding. Moreover, since a prior distribution of each speaking style is more representative and content-independent for the speaking style, optionally, in the case of adopting these prior distributions to obtain a style embedding vector of each style, there is no need to input a target style reference audio in the synthesis stage, thereby having higher quality and stability.

A speaker look-up table (LUT) may be used for obtaining a speaker embedding vector. The resulting speaker embedding vector is more robust in controlling the speaker identity of a synthesized speech.

Training data obtained from multi-speaker multi-style audio may be adopted. These training data may be in a supervised form, e.g., attached with style labels, speaker labels, etc. These labels may be used in the DAT for calculating a gradient back-propagation factor, etc.

In other embodiments of the present disclosure, it is proposed to adopt a combination of paired input and unpaired input and adopt a cyclic training mechanism for the acoustic model, during the training of the acoustic model.

On the input side, there are two sets of input, i.e., paired input and unpaired input. The paired input includes, e.g., a first text and a paired audio corresponding to the first text, wherein the paired audio may be an audio in which a first speaker says the first text in a first style, and the first speaker is a target speaker of speech synthesis. The unpaired input includes, e.g., the first text and an unpaired audio that does not correspond to the first text, wherein the unpaired audio may be an audio in which a second speaker says a second text in a second style, and the second style may be a target style of the style transfer. Through adopting paired input and unpaired input in the training data, it may avoid quality degradation in a situation of taking unpaired input in the synthesis stage, which is due to the fact of always being in a paired situation during the training. Therefore, it may facilitate to implement high-quality cross-speaker style transfer.

On the output side, there are two outputs, i.e., paired output and unpaired output, and the unpaired output may also be referred to as a transfer output. The paired output is predicted acoustic features when the first speaker says the first text in the first style. The unpaired output is predicted acoustic features when the first speaker says the first text in the second style. The unpaired output may achieve cross-speaker style transfer.

For the paired output, acoustic features of the paired audio may be used as a ground truth label for calculating loss metrics, e.g., reconstruction loss. In order to obtain a ground truth label for the transfer output during the training, a cyclic training mechanism may be introduced to the above basic acoustic model, to provide a good loss metric for unpaired output to ensure quality. For example, a cyclic training framework may be formed with a basic acoustic model and a duplicate of the basic acoustic model. The duplicate of the basic acoustic model has the same or similar architecture, parameters, etc. as the basic acoustic model. The unpaired output by the basic acoustic model may be further input to the duplicate of the basic acoustic model, as a reference for the style transfer performed by the duplicate of the basic acoustic model. The duplicate of the basic acoustic model may generate a second unpaired output for the second text, which is predicted acoustic features when the second speaker says the second text in the second style. For the second unpaired output, acoustic features of the unpaired audio may be used as a ground truth label for calculating loss metrics, e.g., cyclic reconstruction loss.

Moreover, any other loss metrics may also be considered during the cyclic training process, e.g., style loss, Generative Adversarial Network (GAN) loss, etc. Moreover, the above cyclic training mechanism is not limited by whether the training data has style labels. Moreover, in the case of adopting the above cyclic training mechanism, specific implementations of the style encoder are not subject to any limitations, which may be a VAE, a GMVAE or any other encoder capable of generating style embedding vectors.

It should be understood that the term "embedding vector" herein may broadly refer to a representation of information in the latent space, which may also be referred to as embedding, latent representation, latent space representation, latent space information representation, etc., and is not limited to adopt a data form of vector, but also covers any other data form, e.g., sequence, matrix, etc.

FIG. 1 illustrates an exemplary conventional style transfer TTS system 100.

The TTS system 100 may be configured for receiving a text 102, and generating a speech waveform 108 corresponding to the text 102. The text 102 may comprise word, phrase, sentence, passage, etc. It should be understood that although the text 102 is shown as being provided to the TTS system 100 in FIG. 1, the text 102 may be first divided into a sequence of elements, e.g., a phoneme sequence, a grapheme sequence, a character sequence, etc., and this sequence is then provided to the TTS system 100 as input. Herein, the input "text" may broadly refer to words, phrases, sentences, etc. included in the text, or a sequence of elements obtained from the text, e.g., a phoneme sequence, a grapheme sequence, a character sequence, etc.

The TTS system 100 may include an acoustic model 110. The acoustic model 110 may predict or generate acoustic features 106 according to the text 102. The acoustic features 106 may include various TTS acoustic features, e.g., mel-spectrum, linear spectrum pair (LSP), etc. The acoustic model 110 may be based on various model architectures, e.g., sequence-to-sequence model architecture, etc. FIG. 1 illustrates an exemplary sequence-to-sequence acoustic model 110, which may include a text encoder 112, an attention module 114, and a decoder 116.

The text encoder 112 may convert information contained in the text 102 into a space that is more robust and more suitable for learning alignment with acoustic features. For example, the text encoder 112 may convert the information in the text 102 into a state sequence in the space, which may also be referred to as a text encoder state sequence. Each state in the state sequence corresponds to a phoneme, a grapheme, or a character in the text 102.

The attention module 114 may apply an attention mechanism. The attention mechanism establishes a connection between the text encoder 112 and the decoder 116, to facilitate to align between text features output by the text encoder 112 and the acoustic features. For example, a connection between each decoding step and a text encoder state may be established, and the connection may indicate each decoding step should correspond to which text encoder state with what weight. The attention module 114 may take the text encoder state sequence and an output of the previous step by the decoder as input, and generate a context vector that represents a weight with which the next decoding step shall align with each text encoder state.

The decoder 116 may map a state sequence output by the encoder 112 to the acoustic features 106 under the influence of the attention mechanism in the attention module 114. In each decoding step, the decoder 116 may take a context vector output by the attention module 114 and an output of the previous step by the decoder as input, and output acoustic features of one or more frames, e.g., mel-spectrum.

In the case of utilizing the TTS system 100 to generate speech based on a target style, the state sequence output by the text encoder 112 may be combined with a style embedding vector 104 corresponding to the target style prepared in advance, to extend the text encoder state sequence. The extended text encoder state sequence may be provided to the attention module 114 for subsequent speech synthesis.

The TTS system 100 may include a vocoder 120. The vocoder 120 may generate the speech waveform 108 based on the acoustic features 106 predicted by the acoustic model 110.

As described above, due to the limitations by system architecture, model design or training approach, the style embedding vector adopted in the conventional TTS system may be unable to characterize a speaking style very well, thus limiting the quality of cross-speaker style transfer speech synthesis. The embodiments of the present disclosure propose a novel training approach for a style encoder, so that the trained style encoder may generate a style embedding vector that is beneficial to achieve high-quality cross-speaker style transfer, thereby enabling an acoustic model to predict acoustic features that are beneficial to achieve high-quality cross-speaker style transfer.

Figure 2:
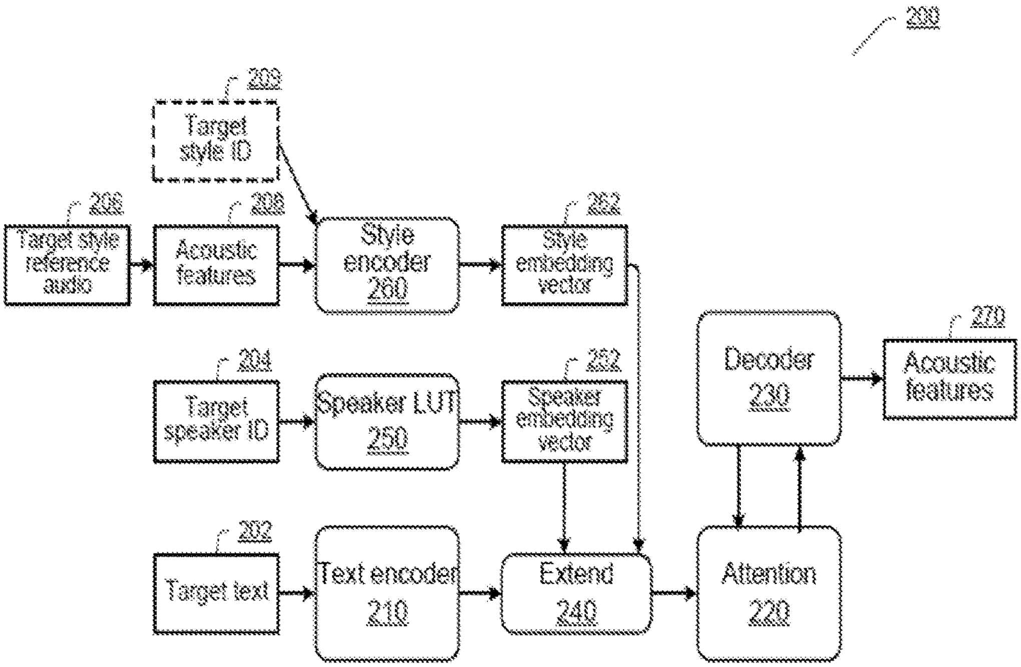
FIG. 2 illustrates an exemplary operating process of an acoustic model in a synthesis stage according to an embodiment.

FIG. 2 illustrates an exemplary operating process 200 of an acoustic model in a synthesis stage according to an embodiment. Herein, the synthesis stage may refer to a stage in which a trained TTS system is applied for speech synthesis after the TTS system is trained. The acoustic model in FIG. 2 is applied for generating corresponding acoustic features for an input target text through cross-speaker style transfer.

The acoustic model may comprise basic components, e.g., a text encoder 210, an attention module 220, a decoder 230, etc. Moreover, the acoustic model may further include components, e.g., an extending module 240, a speaker LUT 250, a style encoder 260 trained according to the embodiments of the present disclosure, etc.

Input to the acoustic model may comprise, e.g., a target text 202, a target speaker ID 204, a target style reference audio 206, etc. The acoustic model aims to generate acoustic features corresponding to the target text 202. The target speaker ID 204 is an identification of a target speaker, wherein the acoustic model aims to generate acoustic features in the target speaker's voice. The target speaker ID may be any identification used for indexing the target speaker, e.g., character, number, etc. The target style reference audio 206 is used as a reference for performing cross-speaker style transfer, which may be, e.g., an audio spoken by a speaker different from the target speaker for a text different from the target text 202. The style of the target style reference audio 206 may be referred to as a target style, and the acoustic model aims to generate acoustic features in the target style.

The text encoder 210 may encode the target text 202 into a corresponding state sequence.

The speaker LUT 250 may generate a corresponding speaker embedding vector 252 based on the target speaker ID 204. For example, a plurality of speaker embedding vectors that characterize different target speakers may be predetermined, and mapping relationship between the plurality of target speaker IDs and the plurality of speaker embedding vectors may be established through a look up table. When the target speaker ID 204 is input, the speaker embedding vector 252 corresponding to this ID may be retrieved with the mapping relationship in the speaker LUT 250. By using the speaker LUT 250, the TTS system may be enabled to become a multi-speaker TTS system, i.e., speech may be synthesized with voices of different speakers. It should be understood that in the case of a single-speaker TTS system, i.e., when the TTS system is used for synthesizing speech with a specific target speaker's voice, the processing of adopting the speaker LUT to obtain a speaker embedding vector may also be omitted.

The style encoder 260 is a generative encoder, which may be obtained through an adversarial training mechanism or a cyclic training mechanism according to the embodiments of the present disclosure. The style encoder 260 may be used for extracting style information from an audio, e.g., generating a style embedding vector 262 based at least on the target style reference audio 206. In an implementation, the style encoder 260 may first extract acoustic features 208 from the target style reference audio 206, and then generate the style embedding vector 262 based on the acoustic features 208. It should be understood that, herein, the processing of generating a style embedding vector based on an audio by a style encoder may broadly refer to generating the style embedding vector directly based on the audio or based on acoustic features of the audio.

In an implementation, the style encoder 260 may be based on the VAE. In this case, the style encoder 260 may determine a posterior distribution of a latent variable having Gaussian distribution based on the acoustic features 208, and generate the style embedding vector 262, e.g., by sampling on the posterior distribution, etc.

In an implementation, the style encoder 260 may be based on the GMVAE. In this case, the style encoder 260 may determine a posterior distribution of a latent variable having Gaussian mixture distribution based on the acoustic features 208 and a target style ID 209, and generate the style embedding vector 262, e.g., by sampling on the posterior distribution, etc. The target style ID may be any identification used for indexing a target style, e.g., character, number, etc. It should be understood that although FIG. 2 shows that the optional target style ID 209 is input to the acoustic model, the GMVAE-based style encoder 260 may also operate without directly receiving a target style ID. For example, the style encoder 260 may infer a corresponding target style based at least on the acoustic features 208 of the target style reference audio 206, and use the inferred target style along with the acoustic features 208 for generating the style embedding vector 262.

The extending module 240 may extend the state sequence output by the text encoder 210 with the speaker embedding vector 252 and the style embedding vector 262. For example, the speaker embedding vector 252 and the style embedding vector 262 may be concatenated to the state sequence, or the speaker embedding vector 252 and the style embedding vector 262 may be superimposed on the state sequence. Through the processing by the extending module 240, the speaker embedding vector 252 and the style embedding vector 262 may be introduced into the generating process of acoustic features, so that the acoustic model may generate acoustic features based at least on the target text, the speaker embedding vector, and the style embedding vector.

The extended text encoder state sequence is provided to the attention module 220. The decoder 230 will predict or generate the final acoustic features 270 under the influence of the attention module 220. The acoustic features 270 may then be used by a vocoder of the TTS system for generating a corresponding speech waveform.

The speech synthesized by the TTS system including the acoustic model shown in FIG. 2 will have the target speaker's voice, have the target speaking style, and take the target text as speech content. Since the style encoder 260 may generate the high-quality style embedding vector 262 for cross-speaker style transfer, the TTS system may also generate high-quality synthesized speech accordingly.

Figure 3:
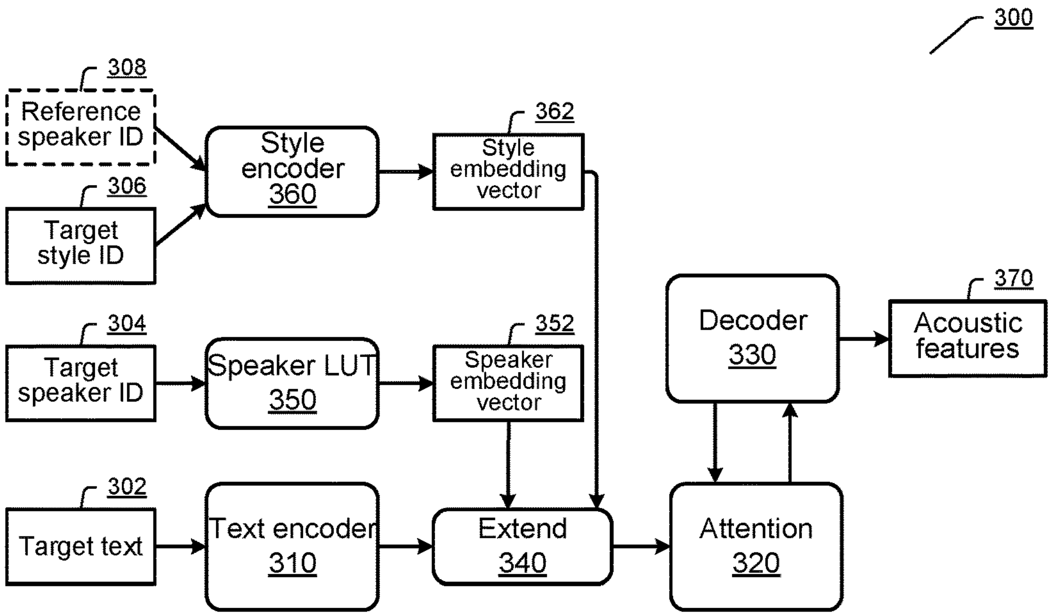
FIG. 3 illustrates an exemplary operating process of an acoustic model in a synthesis stage according to an embodiment.

FIG. 3 illustrates an exemplary operating process 300 of an acoustic model in a synthesis stage according to an embodiment. The acoustic model in FIG. 3 has a substantially similar architecture with the acoustic model in FIG. 2.

Input to the acoustic model in FIG. 3 may include, e.g., a target text 302, a target speaker ID 304, a target style ID 306, an optional reference speaker ID 308, etc.

A text encoder 310 may encode the target text 302 into a corresponding state sequence.

A speaker LUT 350 may generate a corresponding speaker embedding vector 352 based on the target speaker ID 304.

The style encoder 360 is an encoder that adopts at least the LUT technique, which may be obtained through the adversarial training mechanism according to the embodiments of the present disclosure. The style encoder 360 may be based on the GMVAE. The style encoder 360 may determine a prior distribution of a latent variable having Gaussian mixture distribution based on the target style ID 306 and the optional reference speaker ID 308 and by adopting at least the LUT technique, and generate a style embedding vector 362, e.g., by sampling on the prior distribution or calculating a mean value on the prior distribution.

The style encoder 360 may be speaker-dependent or speaker-independent, which depends on whether the same style may be shared among different speakers or needs to be distinguished among different speakers. For example, for a certain style, if different speakers have the same or similar speaking approaches in this style, a speaker-independent style encoder may be used for generating a global style embedding vector for this style. For a certain style, if different speakers have different speaking approaches in this style, a speaker-dependent style encoder may be used for generating different style embedding vectors for different speakers for this style, i.e., characterization of this style considers at least the style itself and speakers. In this case, a style embedding vector may not only include information that characterizes prosody, but also include information that characterizes, e.g., timbre change. Although timbre information reflecting a speaker's voice may be removed from the style embedding vector as much as possible in the embodiments of the present disclosure, the timbre change information may be retained to reflect a specific speaking approach of a specific speaker in the style.

In an implementation, the style encoder 360 may be speaker-independent, so that the style embedding vector 362 may be determined only based on the target style ID 306. For example, the style encoder 360 may first determine a style intermediate representation vector corresponding to the target style ID 306 with a style intermediate representation LUT. The style intermediate representation vector is an intermediate parameter generated during the acquisition of the final style embedding vector, which includes lower-level style information as compared with a style embedding vector. Then, the style encoder 360 may determine a prior distribution of a latent variable based on the style intermediate representation vector, and generate the style embedding vector 362 by sampling or averaging the prior distribution. The style intermediate representation LUT may be created during the training stage, which includes mapping relationship between multiple style IDs and multiple style intermediate representation vectors.

In another implementation, the style encoder 360 may be speaker-dependent, so that the style embedding vector 362 may be determined based on both the target style ID 306 and the reference speaker ID 308. The reference speaker ID may be any identification used for indexing different speakers associated with a certain target style, e.g., character, number, etc. For example, the style encoder 360 may first determine a style intermediate representation vector corresponding to the target style ID 306 with a style intermediate representation LUT, and determine a speaker intermediate representation vector corresponding to the reference speaker ID 308 with a speaker intermediate representation LUT. The speaker intermediate representation vector may characterize a speaker, but it only includes lower-level speaker information as compared with a speaker embedding vector. Then, the style encoder 360 may determine a prior distribution of a latent variable based on the style intermediate representation vector and the speaker intermediate representation vector, and generate the style embedding vector 362 by sampling or averaging the prior distribution. The speaker intermediate representation LUT may also be created during the training stage, which includes mapping relationship between multiple speaker IDs and multiple speaker intermediate representation vectors.

It should be understood that although it is discussed above that the style encoder 360 may determine the prior distribution based on the target style ID and the optional reference speaker ID, sample or average the prior distribution, and generate the style embedding vector in the synthesis stage, the style encoder 360 may also operate in different approaches. In one approach, a prior distribution LUT may be created during the training stage, which includes mapping relationship between multiple prior distributions generated during the training and corresponding target style IDs and possible speaker IDs. Therefore, in the synthesis stage, the style encoder may directly retrieve a corresponding prior distribution from the prior distribution LUT based on a target style ID and an optional reference speaker ID. Then, the prior distribution may be sampled or averaged to generate a style embedding vector. In another approach, a prior distribution mean value LUT may be created during the training stage, which includes mapping relationship between mean values of multiple prior distributions generated during the training and corresponding target style IDs and possible speaker IDs. Therefore, in the synthesis stage, the style encoder may directly retrieve a mean value of a corresponding prior distribution from the prior distribution mean value LUT based on a target style ID and an optional reference speaker ID. Then, this mean value may be used for forming a style embedding vector. In another approach, a style embedding vector LUT may be created during the training stage, which includes mapping relationship between multiple style embedding vectors generated during the training and corresponding target style IDs and possible speaker IDs. Therefore, in the synthesis stage, the style encoder may directly retrieve a corresponding style embedding vector from the style embedding vector LUT based on a target style ID and an optional reference speaker ID.

The extending module 340 may extend the state sequence output by the text encoder 310 with the speaker embedding vector 352 and the style embedding vector 362. The extended text encoder state sequence is provided to an attention module 320. A decoder 330 will predict or generate the final acoustic features 370 under the influence of the attention module 320. The acoustic features 370 may then be used by a vocoder of the TTS system for generating a corresponding speech waveform.

Different from FIG. 2 in which a target style reference audio is required to be input for specifying a target style, the process 300 in FIG. 3 only requires the inputting of a target style ID and an optional reference speaker ID for specifying a target style, and thus the style encoder may output a style embedding vector with higher stability and robustness.

Figure 4:
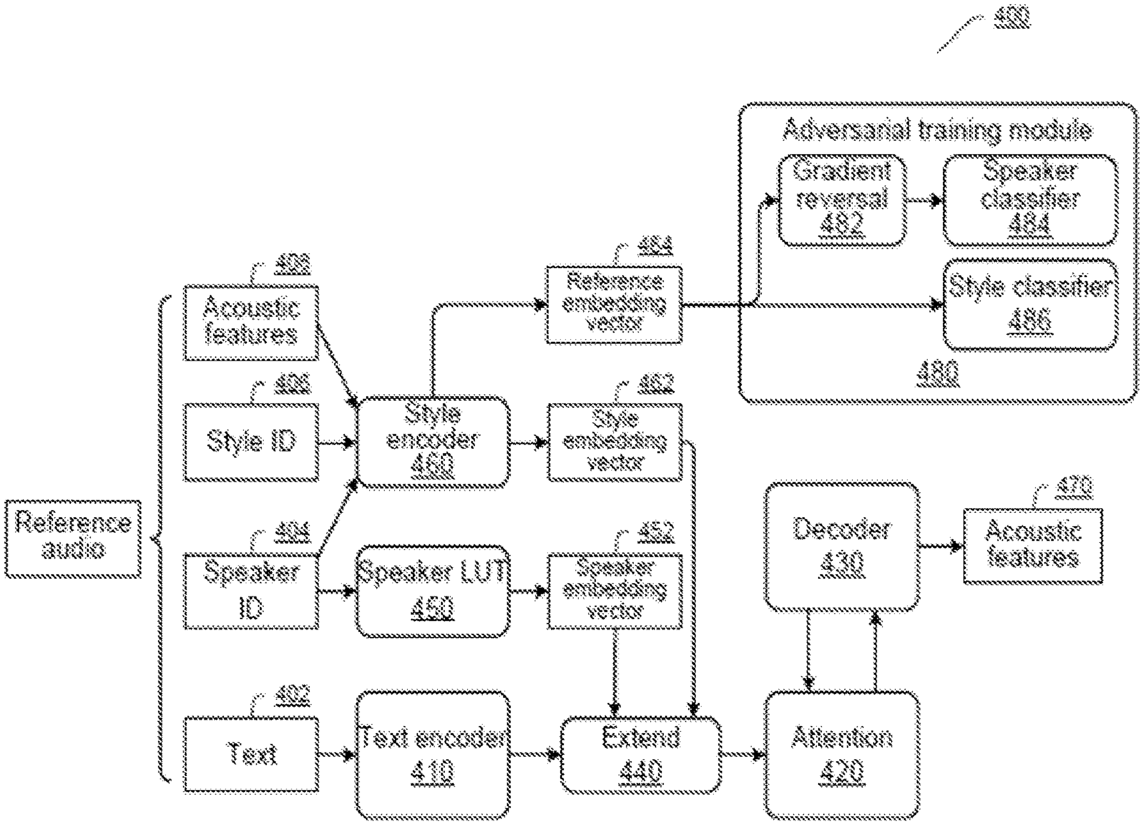
FIG. 4 illustrates an exemplary process for training an acoustic model according to an embodiment.

FIG. 4 illustrates an exemplary process 400 for training an acoustic model according to an embodiment. The process 400 may be for training, e.g., the acoustic model in FIG. 2, the acoustic model in FIG. 3, etc. In the case of performing the process 400 for training the acoustic model, a style encoder in the acoustic model may be, e.g., a VAE, a GMVAE, etc., and may be obtained through an adversarial training mechanism.

Training data may be obtained first. Each piece of training data may comprise various types of information extracted from a reference audio. For example, FIG. 4 shows that a text 402, a speaker ID 404, a style ID 406, acoustic features 408, etc. corresponding to an exemplary reference audio are extracted from the reference audio. The text 402 is speech content in the reference audio. The speaker ID 404 is an identification of a speaker of the reference audio. The style ID 406 is an identification of a style adopted by the reference audio. The acoustic features 408 are extracted from the reference audio.

A text encoder 410 is trained for encoding the text 402 into a state sequence. A speaker LUT 450 may be used for generating a speaker embedding vector 452 based on the speaker ID 404. A style encoder 460 may be trained based on, e.g., speaker ID, style ID, acoustic features 408, etc., and output a style embedding vector 462 corresponding to the style of the reference audio. An extending module 440 may extend the state sequence output by the text encoder 410 with the speaker embedding vector 452 and the style embedding vector 462. An attention module 420 may generate a context vector based at least on the extended state sequence. Optionally, the attention module 420 may generate a context vector based on the extended state sequence and an output of the previous step of a decoder. A decoder 430 may predict acoustic features 470 based at least on the context vector. Optionally, the decoder 430 may predict acoustic features based on the context vector and an output of the previous step of the decoder.

According to the process 400, the style encoder 460 may be obtained through an adversarial training mechanism such as DAT. For example, an adversarial training module 480 may be used for implementing the adversarial training mechanism. During the generating of the style embedding vector 462 by the style encoder 460, a reference embedding vector 464 may be obtained as an intermediate parameter. For example, the style encoder 460 may comprise a reference encoder formed by a convolutional neural network (CNN), a long short-term memory (LSTM) network, etc., which is used for generating the reference embedding vector 464 based on the acoustic features 408. The reference embedding vector 464 generally has a high dimension and is designed for obtaining as much information as possible from the acoustic features 408. Adversarial training may be performed on the reference embedding vector 464 in order to remove speaker information and retain style information. The style encoder 460 may further generate the style embedding vector 462 based on the reference embedding vector 464 being performed the adversarial training. For example, the style encoder 460 may include a full connection (FC) layer. The full connection layer may generate the style embedding vector 462 based on the reference embedding vector 464 being performed the adversarial training and the style ID 406, or may generate the style embedding vector 462 based on the reference embedding vector 464 being performed the adversarial training, the style ID 406 and the speaker ID 404. Compared with the reference embedding vector 464, the style embedding vector 462 has a low dimension, and captures higher-level information about, e.g., speaking style.

In an implementation, the adversarial training module 480 may implement DAT with at least a speaker classifier 484 and a style classifier 486. The speaker classifier 484 may generate a speaker classification result, e.g., prediction of probability of different speakers, based on input features, e.g., a reference embedding vector. The style classifier 486 may generate a style classification result, e.g., prediction of probability of different speaking style, based on input features e.g., a reference embedding vector. In one aspect, gradient reversal processing may be first performed on the reference embedding vector 464 through a gradient reversal layer at 482, and then the speaker classifier 484 may generate a speaker classification result for the reference embedding vector being performed the gradient reversal processing. In another aspect, the style classifier 486 may generate a style classification result for the reference embedding vector 464. The adversarial training module 480 may calculate a gradient back-propagation factor through a loss function. The loss function is based at least on a comparison result between the style classification result and the style ID 406 and a comparison result between the speaker classification result and the speaker ID 404. In one aspect, the optimizing process that is based on the loss function may cause the speaker classification result predicted by the speaker classifier 484 for the input features to approximate the speaker ID 404. Since the gradient reversal processing is performed on the reference embedding vector 464 before the speaker classifier 484, the optimizing process is actually performed toward reducing information contained in the reference embedding vector 464 that helps the speaker classifier 484 to output a correct classification result, thereby achieving the removal of speaker information. In another aspect, the optimizing process that is based on the loss function may cause the style classification result predicted by the style classifier 486 for the input features to approximate the style ID 406. The more accurate the classification result from the style classifier 486 is, the more information about style the reference embedding vector 464 includes, thereby achieving the retaining of style information.

The reference embedding vector 464 being performed the adversarial training will retain as much style information as possible, and remove as much speaker information as possible. Therefore, the style embedding vector 462 which is further generated based on the reference embedding vector 464 will also retain as much style information as possible and remove as much speaker information as possible. The style embedding vector 462 may lead to subsequent high-quality acoustic features 470 and further high-quality synthesized speech.

Through the training by the process 400, two types of acoustic models may be obtained, e.g., the generative acoustic model as shown in FIG. 2 and the acoustic model adopting at least the LUT technique as shown in FIG. 3.

It should be understood that the training of the acoustic model in FIG. 4 may be deemed as a part of the training of the entire TTS system. For example, when training a TTS system including an acoustic model and a vocoder, the training process in FIG. 4 may be applied to the acoustic model in the TTS system.

As described above, the style encoder may adopt, e.g., VAE, GMVAE, etc. Therefore, in the training process 400 in FIG. 4, the style embedding vector 462 may correspond to a prior distribution or a posterior distribution of a latent variable having Gaussian distribution or Gaussian mixture distribution. Further training details in the case that the style encoder adopts VAE or GMVAE will be discussed hereinafter in conjunction with FIG. 5 and FIG. 6.

Figure 5:
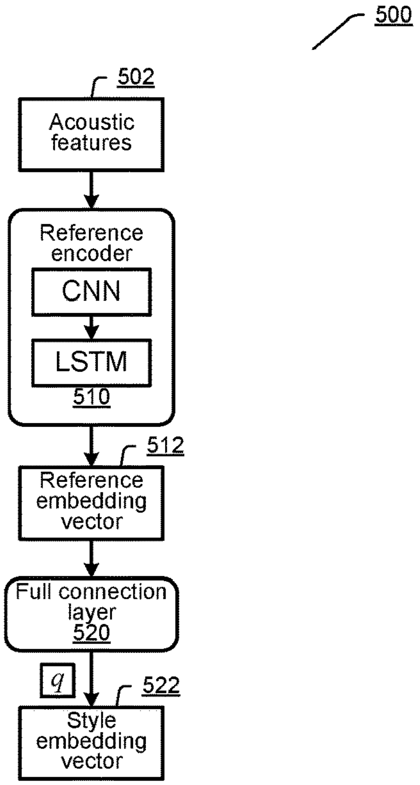
FIG. 5 illustrates an exemplary data flow within a style encoder in a training stage according to an embodiment.

FIG. 5 illustrates an exemplary data flow 500 within a style encoder in a training stage according to an embodiment. The data flow 500 may be used for further illustrating the training mechanism when the style encoder 460 in FIG. 4 adopts the VAE.

As shown in FIG. 5, input used for training the style encoder may comprise acoustic features 502. The acoustic features 502 may be further provided to a reference encoder 510.

The reference encoder 510 may encode the acoustic features 502 into a reference embedding vector 512. In an embodiment, the reference encoder 510 may comprise, e.g., CNN, LSTM, etc. The reference embedding vector 512 may be passed to a full connection layer 520, for determining characterization parameters of a Gaussian distribution of a latent variable z. For example, the full connection layer 520 may comprise two full connection layers for generating a mean value and a variance of the latent variable z respectively. The style embedding vector 522 may be obtained through, e.g., sampling the determined Gaussian distribution. The distribution determined by the full connection layer 520 may be deemed as a posterior distribution q of the latent variable z.

Based on the example of the data flow 500, after the training is completed, the style encoder may generate a style embedding vector based on input acoustic features of a target style reference audio.

Figure 6:
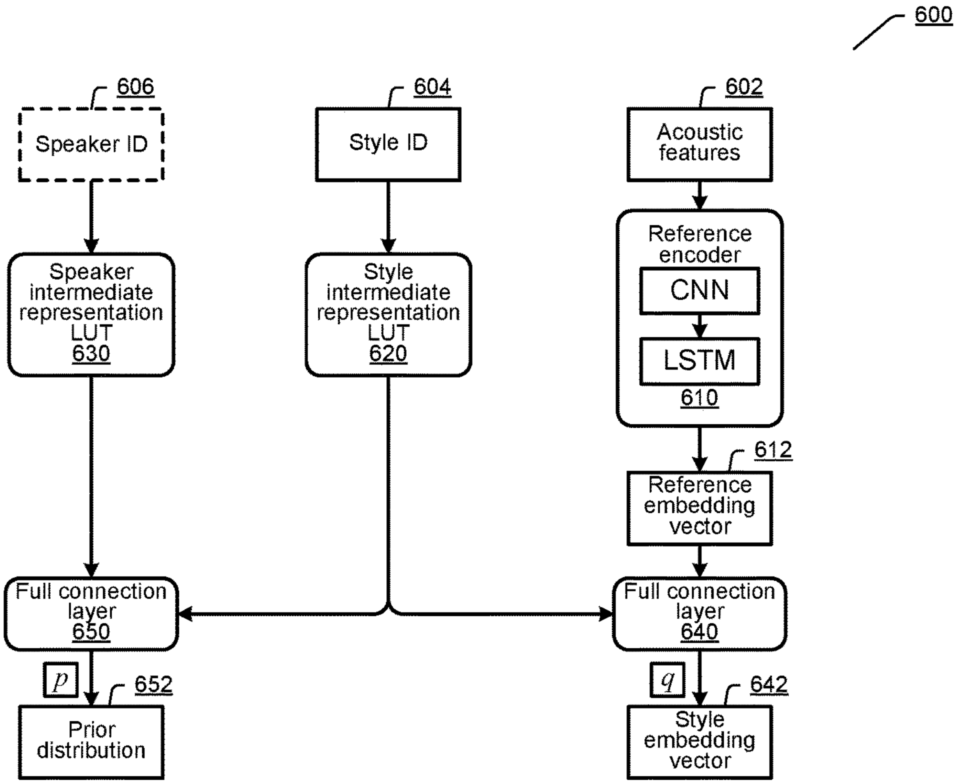
FIG. 6 illustrates an exemplary data flow within a style encoder in a training stage according to an embodiment.

FIG. 6 illustrates an exemplary data flow 600 within a style encoder in a training stage according to an embodiment. The data flow 600 may be used for further illustrating the training mechanism when the style encoder 460 in FIG. 4 adopts the GMVAE.

As shown in FIG. 6, input used for training the style encoder may comprise acoustic features 602, a style ID 604, an optional speaker ID 606, etc. corresponding to a reference audio. When the training does not adopt the speaker ID 606, the style encoder may be deemed as a speaker-independent style encoder. When the training adopts the speaker ID 606, the style encoder may be deemed as a speaker-dependent style encoder.

The acoustic features 602 may be provided to a reference encoder 610. Similar to the reference encoder 510 in FIG. 5, the reference encoder 610 may encode the acoustic features 602 into a reference embedding vector 612.

The style ID 604 may be provided to a style intermediate representation LUT 620 in order to output a corresponding style intermediate representation vector.

The reference embedding vector 612 and the style intermediate representation vector may be passed to a full connection layer 640, for determining characterization parameters of a Gaussian mixture distribution of a latent variable z. For example, the full connection layer 640 may comprise two full connection layers for generating a mean value and a variance of the latent variable z respectively. A style embedding vector 642 may be obtained through sampling the determined Gaussian mixture distribution. The distribution determined by the full connection layer 640 may be deemed as a posterior distribution q of the latent variable z.

When the training input includes the speaker ID 606, the speaker ID 606 may be provided to a speaker intermediate representation LUT 630 in order to output a corresponding speaker intermediate representation vector.

The style intermediate representation vector output by the style intermediate representation LUT 620 and the possible speaker intermediate representation vector output by the speaker intermediate representation LUT 630 may be passed to a full connection layer 650, for determining characterization parameters of a Gaussian mixture distribution of a latent variable z. The distribution determined by the full connection layer 650 may be deemed as a prior distribution p of the latent variable z. It should be understood that, through using a plurality of training data for training, a plurality of prior distributions 652 may be finally obtained, wherein each prior distribution corresponds to a speaking style. Through sampling or averaging a prior distribution, a style embedding vector corresponding to the prior distribution may be obtained.

Based on the example of the data flow 600, after the training is completed, the style encoder will have, e.g., an operating mode similar with the generative acoustic model shown in FIG. 2, an operating mode similar with the acoustic model adopting at least the LUT technique shown in FIG. 3, etc.

It should be understood that in FIG. 5 and FIG. 6, depending on whether the style encoder adopts the VAE or the GMVAE, there exists corresponding computational constraints between a prior distribution p and a posterior distribution q of a latent variable z. Some details about the VAE and the GMVAE will be further discussed below.

The conventional VAE constructs a relationship between an unobservable continuous random latent variable z and an observable data set x. $q_\Phi(z|x)$ is introduced as an approximation to the true posterior density $p_\theta(z|x)$ which is intractable. Following the variational principle, log $p_\theta(x)$, as an optimization target, may be represented as:

$$\begin{aligned}\log p_\theta(x) &= KL[q_\Phi(z|x)\|p_\theta(z|x)] + \mathcal{L}(\theta, \Phi; x) \\ &\geq \mathcal{L}(\theta, \Phi; x) \\ &= \mathbb{E}_{q\Phi}(z|x)[\log p_\theta(x|z)] - KL[q_\Phi(z|x)\|p_\theta(z)]\end{aligned} \quad \text{Equation (1)}$$

wherein x is a data sample (e.g., acoustic features), z is a latent variable, a prior distribution $p_\theta(z)$ over z is Gaussian distribution, and $\mathcal{L}(\theta, \Phi; x)$ is a variational lower boundary to be optimized. $KL[q_\Phi(z|x)\|p_\theta(z)]$ may correspond to KL loss, and $-\mathbb{E}_{q_\Phi(Z|X)}[\log p_\theta(z|z)]$ may correspond to reconstruction loss.

When applying VAE to a TTS for style-related modeling, the training target of pure TTS and VAE may be merged as:

$$\text{Loss}=KL[q_\Phi(z|x)\|p_\theta(z)]-\mathbb{E}_{q_\Phi(Z|X)}[\log p_\theta(x|z,t)]+l_{stop} \quad \text{Equation (2)}$$

wherein Loss is the total loss, and the conditional reconstruction likelihood $p_\theta(x|z)$ in Equation (1) is modified to depend on both the latent variable z and an input text t, i.e., $p_\theta(x|z, t)$. Optionally, the stop token loss $l_{stop}$ of the pure TTS may also be included in the total loss.

The distribution of the latent variable z may be influenced by a style distribution variable corresponding to a speaking style and an optional speaker distribution variable corresponding to a speaker. The influence to the latent variable z by the speaking style will be discussed below by taking the GMVAE as an example.

In the GMVAE, the latent variable z is parameterized by a Gaussian mixture model. The main target to maximize is:

$$\mathcal{L}_G = \mathbb{E}_{q_\Phi}(y, z|x)\left[\log\frac{p(x, y, z|t)}{q_\Phi(y, z|x)}\right] = \mathbb{E}_{q_\Phi}(y|x)_{q\Phi}(z|x, y)\left[\log p(x|y, z, t) + \log\frac{p(z|y)}{q_\Phi(z|x, y)} - \log q_\Phi(y|x) + \log p(y)\right] = \sum\nolimits_{y_i,i=1}^{K} q_\Phi(y_i|x)\mathbb{E}_{q_\Phi}(z|x, y_i)[\log p(x|y_i, z, t)] - \sum\nolimits_{y_i,i=1}^{K} q_\Phi(y_i|x)D_{KL}(q_\Phi(z|x, y_i)\|p(z|y_i)) - \sum\nolimits_{y_i,i=1}^{K} q_\Phi(y_i|x)\log q_\Phi(y_i|x) \quad \text{Equation (3)}$$

wherein x is a data sample, t is an input text, z is a latent variable with Gaussian mixture distribution, and mean value and variance of z are parameterized at least with a style distribution variable y corresponding to a speaking style.

When the model training includes the adversarial training shown in FIG. 4, the total loss may be represented as:

$$L_{Total} = -\mathcal{L}_G + L_{style} + L_{spk} + l_{stop} \quad \text{Equation (4)}$$

wherein $\mathcal{L}_G$ is a variational lower boundary of the GMVAE-based TTS, as shown in Equation (3), $L_{style}$ and $L_{spk}$ are losses of a style classifier and a speaker classifier calculated by using, e.g., cross-entropy, respectively, and $l_{stop}$ is a stop token loss in the TTS calculated by using, e.g., cross-entropy.

It should be understood that the above parts only present examples of determining latent variable distributions in the VAE and the GMVAE, and these examples may be modified and supplemented in any approaches according to specific application requirements. For example, any of the above Equations (1) to (4) may be modified, so as to introduce a style distribution variable and/or a speaker distribution variable to influence the distribution of the latent variable z. For example, an introduction of the style distribution variable y is exemplarily presented in Equation (3), and a speaker distribution variable corresponding to a reference speaker may also be introduced into any of the above equations in a similar manner.

According to the embodiments of the present disclosure, a combination of paired input and unpaired input may be adopted during the training of an acoustic model, and a cyclic training mechanism may be adopted for the acoustic model to solve the problem of lack of ground truth labels in transfer outputs.

Figure 7:
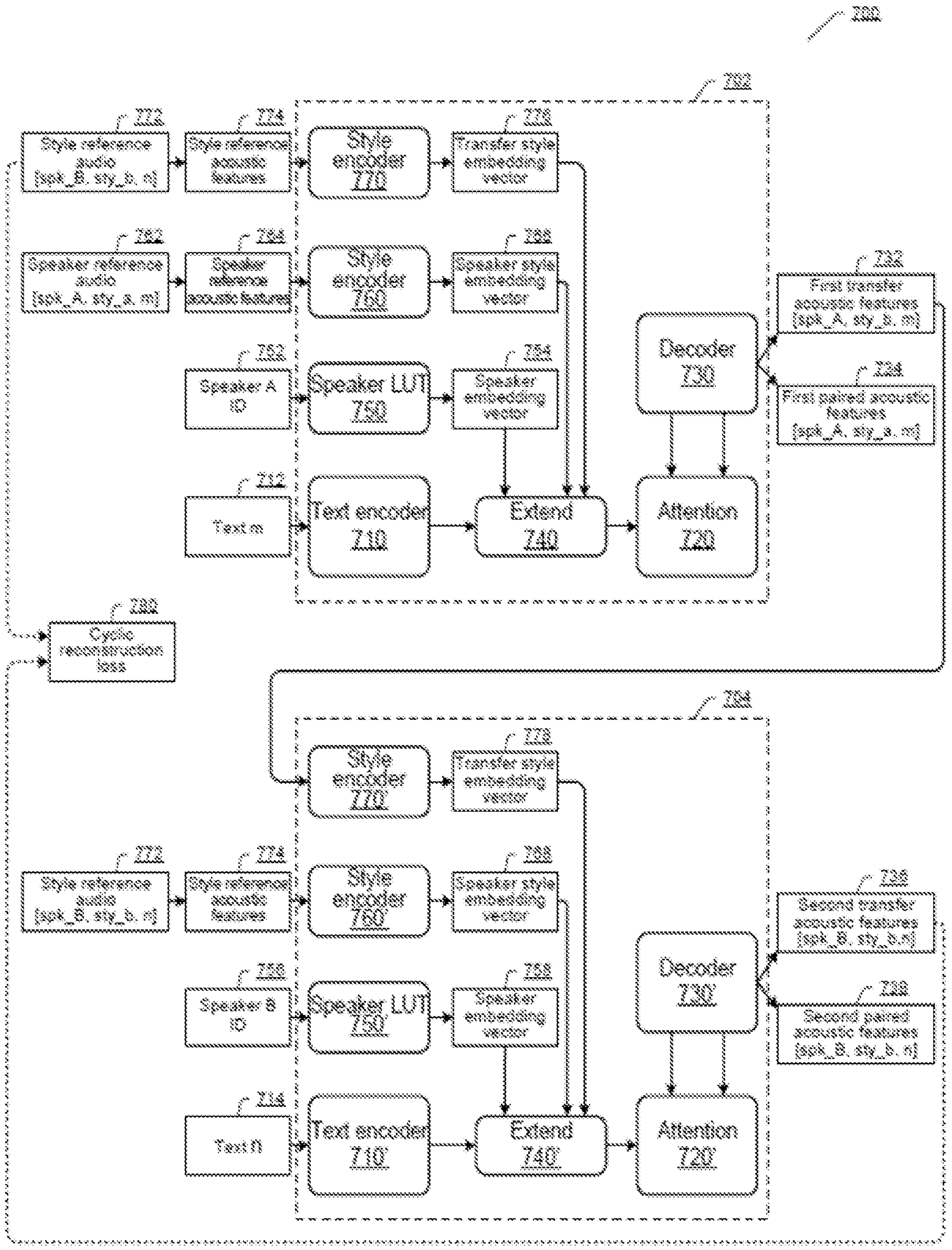
FIG. 7 illustrates an exemplary process for training an acoustic model according to an embodiment.

FIG. 7 illustrates an exemplary process 700 for training an acoustic model according to an embodiment. The process 700 may be for training, e.g., the acoustic model in FIG. 2. In the process 700, a cyclic training framework may be formed with an acoustic model 702, which is a basic model, and a duplicate 704 of the acoustic model, and a style encoder and an acoustic model with higher-performance may be obtained at least through a cyclic training mechanism.

In FIG. 7, the acoustic model 702 to be trained may comprise a text encoder 710, an attention module 720, a decoder 730, an extending module 740, a speaker LUT 750, a style encoder 770, etc. For the purpose of training, an additional style encoder 760 is also provided in FIG. 7, however, it should be understood that after the acoustic model has been trained, the style encoder 760 may be omitted. The duplicate 704 of the acoustic model has the same or similar architecture, parameters, etc. as the acoustic model 702. A text encoder 710', an attention module 720', a decoder 730', an extending module 740', a speaker LUT 750', a style encoder 760' and a style encoder 770' in the duplicate 704 of the acoustic model may correspond to the text encoder 710, the attention module 720, the decoder 730, the extending module 740, the speaker LUT 750, the style encoder 760 and the style encoder 770 in the acoustic model 702, respectively. It should be understood that the text encoders, the attention modules, the decoders, the extending modules, the speaker LUT, the style encoders, etc. in FIG. 7 have similar functions with the corresponding components in FIG. 2.

Training data may be obtained first. Each piece of training data may comprise various types of information extracted from a speaker reference audio and a style reference audio. The speaker reference audio is an audio from a target speaker of style transfer speech synthesis. The style reference audio is an audio with a target style of the style transfer speech synthesis. For example, FIG. 7 shows a text m 712, a speaker A ID 752, speaker reference acoustic features 764, etc., extracted from an exemplary speaker reference audio 762. The speaker reference audio 762 may be denoted as [spk_A, sty_a, m], wherein spk_A denotes a speaker A of the audio, sty_a denotes a style a of the audio, and m denotes the text m corresponding to the audio. The speaker reference acoustic features 764 refer to acoustic features extracted from the speaker reference audio 762. FIG. 7 further shows a text n 714, a speaker B ID 756, style reference acoustic features 774, etc., extracted from an exemplary style reference audio 772. The style reference audio 772 may be denoted as [spk_B, sty_b, n], wherein spk_B denotes a speaker B of the audio, sty_b denotes a style b of the audio, and n denotes the text n corresponding to the audio. The style reference acoustic features 774 refer to acoustic features extracted from the style reference audio 772.

The text m 712 and the speaker reference audio 762, or the text m 712 and the speaker reference acoustic features 764 extracted from the speaker reference audio 762, may be used as a paired input to the acoustic model 702, for predicting a paired output. For example, the text encoder 710 may encode the text m 712 into a state sequence corresponding to the text m. The speaker LUT 750 may generate a speaker embedding vector 754 corresponding to the speaker A based on the speaker A ID 752. The style encoder 760 may generate a speaker style embedding vector 766 corresponding to the style a based at least on the speaker reference acoustic features 764. The extending module 740 may extend the state sequence of the text m output by the text encoder 710 with the speaker embedding vector 754 and the speaker style embedding vector 766. The decoder 730 may predict first paired acoustic features 734 at least under the influence of the attention module 720. The first paired acoustic features 734 adopt the speaker A's voice, adopt the style a, and are directed to the text m, and thus may be denoted as [spk_A, sty_a, m]. The first paired acoustic features 734 are a paired output by the acoustic model 702. It may be seen that, through the acoustic model 702, the first paired acoustic features 734 may be generated based at least on the text m 712, the speaker A ID 752, and the speaker style embedding vector 766 corresponding to the style a.

The text m 712 and the style reference audio 772, or the text m 712 and the style reference acoustic features 774 extracted from the style reference audio 772, may be used as an unpaired input to the acoustic model 702, for predicting an unpaired output. The style encoder 770 may generate a transfer style embedding vector 776 corresponding to the style b based at least on the style reference acoustic features 774. The extending module 740 may use the speaker embedding vector 754 and the transfer style embedding vector 776 for extending the state sequence of the text m output by the text encoder 710. The decoder 730 may predict first transfer acoustic features 732 at least under the influence of the attention module 720. The first transfer acoustic features 732 adopt the speaker A's voice, adopt the style b, and are directed to the text m, and thus may be denoted as [spk_A, sty_b, m]. The first transfer acoustic features 732 are an unpaired output by the acoustic model 702. It may be seen that, through the acoustic model 702, the first transfer acoustic features 732 may be generated based at least on the text m 712, the speaker A ID 752, and the transfer style embedding vector 776 corresponding to the style b.

The speaker reference acoustic features 764 corresponding to the speaker reference audio 762 in the training data may be used as a ground truth label for the first paired acoustic features 734, so that the speaker reference acoustic features 764 and the first paired acoustic features 734 may be used for calculating loss metrics, e.g., reconstruction loss, etc. However, there is no ground truth label for the first transfer acoustic features 732 in the training data, and thus, loss metrics for the first transfer acoustic features 732 cannot be calculated effectively. In view of this situation, the process 700 further introduces the duplicate 704 of the acoustic model to solve the problem of difficulty in calculating loss metrics for the transfer output.

The text n 714 and the style reference audio 772, or the text n 714 and the style reference acoustic features 774 extracted from the style reference audio 772, may be used as a paired input to the duplicate 704 of the acoustic model, for predicting a paired output. For example, the text encoder 710' may encode the text n 714 into a state sequence corresponding to the text n. The speaker LUT 750' may generate a speaker embedding vector 758 corresponding to the speaker B based on the speaker B ID 756. The style encoder 760' may generate a speaker style embedding vector 768 corresponding to the style b based at least on the style reference acoustic features 774. The extending module 740' may extend the state sequence of the text n output by the text encoder 710' with the speaker embedding vector 758 and the speaker style embedding vector 768. The decoder 730' may predict second paired acoustic features 738 at least under the influence by the attention module 720'. The second paired acoustic features 738 adopt the speaker B's voice, adopt the style b, and are directed to the text n, and thus may be denoted as [spk_B, sty_b, n]. The second paired acoustic features 738 are a paired output by the duplicate 704 of the acoustic model. It may be seen that, through the duplicate 704 of the acoustic model, the second paired acoustic features 738 may be generated based at least on the text n 714, the speaker B ID 756, and the speaker style embedding vector 768 corresponding to the style b.

The text n 714 and the first transfer acoustic features 732 may be used as an unpaired input to the duplicate 704 of the acoustic model, for predicting an unpaired output. The style encoder 770' may generate a transfer style embedding vector 778 corresponding to the style b based at least on the first transfer acoustic features 732. The extending module 740' may use the speaker embedding vector 758 and the transfer style embedding vector 778 for extending the state sequence of the text n output by the text encoder 710'. The decoder 730' may predict second transfer acoustic features 736 at least under the influence of the attention module 720'. The second transfer acoustic features 736 adopt the speaker B's voice, adopt the style b, and are directed to the text n, and thus may be denoted as [spk_B, sty_b, n]. The second transfer acoustic features 736 are an unpaired output by the duplicate 704 of the acoustic model. It may be seen that, through the duplicate 704 of the acoustic model, the second transfer acoustic features 736 may be generated based at least on the text n 714, the speaker B ID 756, and the transfer style embedding vector 778 corresponding to the style b.

The style reference acoustic features 774 of the style reference audio 772 may be used as a ground truth label for the second paired acoustic features 738, and thus the style reference acoustic features 774 and the second paired acoustic features 738 may be used for calculating loss metrics, e.g., reconstruction loss, etc. Moreover, the style reference acoustic features 774 of the style reference audio 772 in the training data may be used as a ground truth label for the second transfer acoustic features 736, and thus the style reference acoustic features 774 and the second transfer acoustic features 736 may be used for calculating loss metrics, e.g., cyclic reconstruction loss 780. The cyclic reconstruction loss 780 is a reconstruction loss calculated according to the cyclic training process in FIG. 7.

Through training the acoustic model according to the process 700, since both paired inputs and unpaired inputs are adopted during the training, even if there are unpaired inputs in the synthesis stage, high-quality cross-speaker style transfer may still be achieved. Moreover, since the cyclic training process determines ground truth labels for transfer outputs, which may be used for calculating loss metrics, the performance of the trained acoustic model may be greatly enhanced.

It should be understood that the loss metrics considered in the process 700 are not limited to the above-mentioned reconstruction loss and cyclic reconstruction loss, and any other loss metrics may also be considered. Moreover, the above cyclic training mechanism is not limited by whether the training data has style labels, i.e., it is not required to label styles in the training data. Moreover, the specific implementation of the style encoder in FIG. 7 is not limited in any approaches, and it may be a VAE, a GMVAE or any other encoder that can be used for generating a style embedding vector. Moreover, the adversarial training process in FIG. 4 may also be combined into the process 700 in FIG. 7. For example, the adversarial training mechanism implemented by the adversarial training module 480 in FIG. 4 is further applied to the style encoder in FIG. 7.

Figure 8:
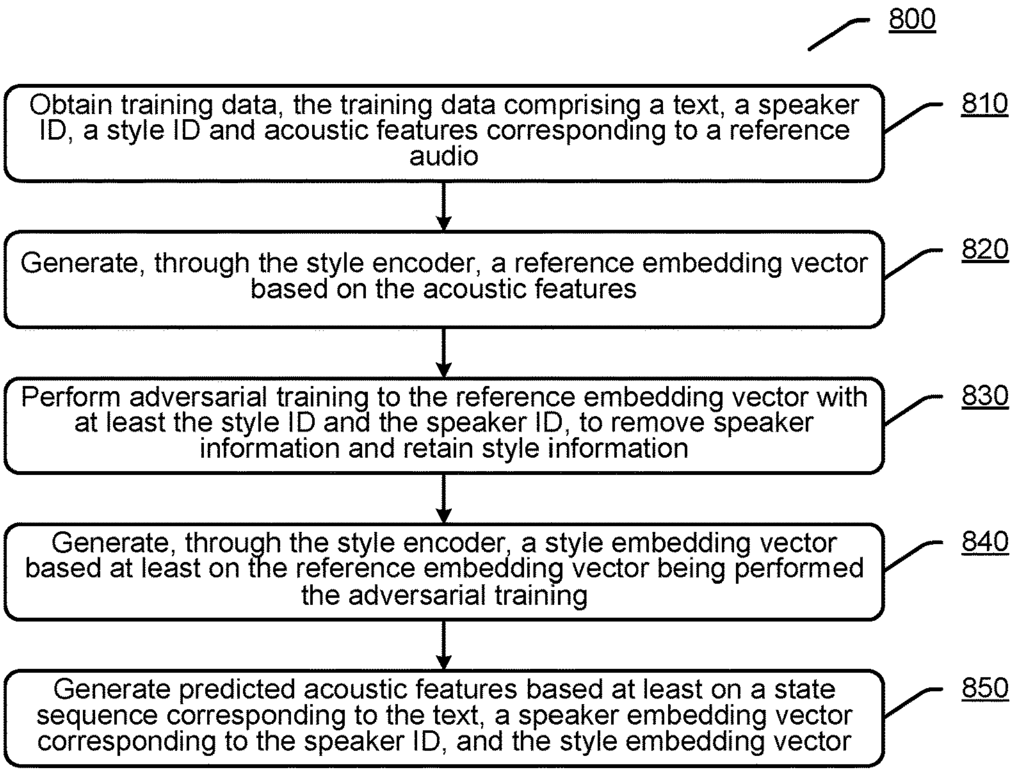
FIG. 8 illustrates a flowchart of an exemplary method for training an acoustic model according to an embodiment.

FIG. 8 illustrates a flowchart of an exemplary method 800 for training an acoustic model according to an embodiment. The acoustic model may be for implementing cross-speaker style transfer and comprise at least a style encoder. The method 800 may be based at least on, e.g., the exemplary training processes discussed in FIG. 4-FIG. 6.

At 810, training data may be obtained, the training data comprising a text, a speaker ID, a style ID and acoustic features corresponding to a reference audio.

At 820, a reference embedding vector may be generated, through the style encoder, based on the acoustic features.

At 830, adversarial training may be performed to the reference embedding vector with at least the style ID and the speaker ID, to remove speaker information and retain style information.

At 840, a style embedding vector may be generated, through the style encoder, based at least on the reference embedding vector being performed the adversarial training.

At 850, predicted acoustic features may be generated based at least on a state sequence corresponding to the text, a speaker embedding vector corresponding to the speaker ID, and the style embedding vector.

In an implementation, the generating a reference embedding vector may comprise: generating the reference embedding vector based on the acoustic features through a CNN and a LSTM network in the style encoder.

In an implementation, the performing adversarial training may comprise: generating, through a style classifier, a style classification result for the reference embedding vector; performing gradient reversal processing to the reference embedding vector; generating, through a speaker classifier, a speaker classification result for the reference embedding vector being performed the gradient reversal processing; and calculating a gradient back-propagation factor through a loss function, the loss function being based at least on a comparison result between the style classification result and the style ID and a comparison result between the speaker classification result and the speaker ID.

In an implementation, the adversarial training may be performed by a DAT module.

In an implementation, the generating a style embedding vector may comprise: generating, through a full connection layer in the style encoder, the style embedding vector based at least on the reference embedding vector being performed the adversarial training, or based at least on the reference embedding vector being performed the adversarial training and the style ID.

Moreover, the generating a style embedding vector may comprise: generating, through a second full connection layer in the style encoder, the style embedding vector based at least on the style ID, or based at least on the style ID and the speaker ID.

In an implementation, the style encoder may be a VAE or a GMVAE.

In an implementation, the style embedding vector may correspond to a prior distribution or a posterior distribution of a latent variable having Gaussian distribution or Gaussian mixture distribution.

In an implementation, the method 800 may further comprise: obtaining a plurality of style embedding vectors corresponding to a plurality of style IDs respectively, or obtaining a plurality of style embedding vectors corresponding to a plurality of combinations of style ID and speaker ID respectively, through training the acoustic model with a plurality of training data.

In an implementation, the method 800 may further comprise: encoding the text into the state sequence through a text encoder in the acoustic model; and generating the speaker embedding vector through a speaker LUT in the acoustic model. The generating predicted acoustic features may comprise: extending the state sequence with the speaker embedding vector and the style embedding vector; generating, through an attention module in the acoustic model, a context vector based at least on the extended state sequence; and generating, through a decoder in the acoustic model, the predicted acoustic features based at least on the context vector.

In an implementation, the method 800 may further comprise, during applying the acoustic model: receiving an input, the input comprising a target text, a target speaker ID, and a target style reference audio and/or a target style ID; generating, through the style encoder, a style embedding vector based at least on acoustic features of the target style reference audio and/or the target style ID; and generating acoustic features based at least on the target text, the target speaker ID and the style embedding vector.

Moreover, the input may further comprise a reference speaker ID. The generating a style embedding vector may be further based on the reference speaker ID.

In an implementation, the method 800 may further comprise, during applying the acoustic model: receiving an input, the input comprising a target text, a target speaker ID, and a target style ID; selecting, through the style encoder, a style embedding vector from a plurality of predetermined candidate style embedding vectors based at least on the target style ID; and generating acoustic features based at least on the target text, the target speaker ID and the style embedding vector.

Moreover, the input may further comprise a reference speaker ID. The selecting a style embedding vector may be further based on the reference speaker ID.

In an implementation, the acoustic features may be mel-spectrum extracted from the reference audio.

It should be understood that the method 800 may further comprise any step/process for training an acoustic model according to the embodiments of the present disclosure described above.

Figure 9:
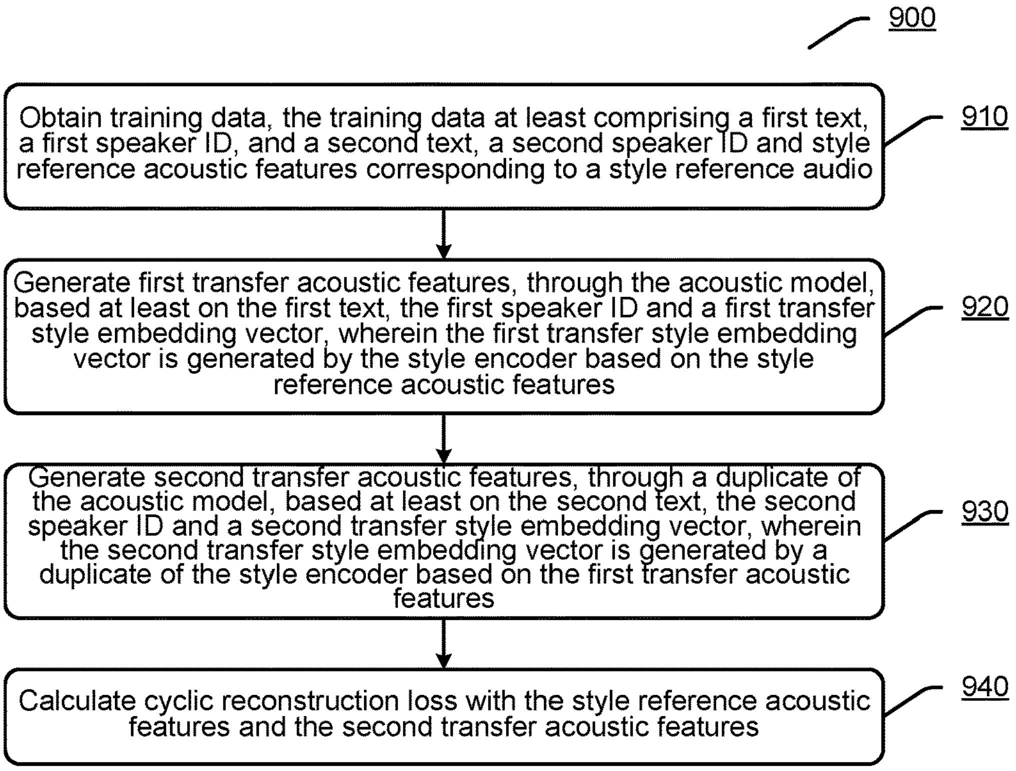
FIG. 9 illustrates a flowchart of an exemplary method for training an acoustic model according to an embodiment.

FIG. 9 illustrates a flowchart of an exemplary method 900 for training an acoustic model according to an embodiment. The acoustic model may be for implementing cross-speaker style transfer and comprise at least a style encoder. The method 900 may be based at least on, e.g., the exemplary training process discussed in FIG. 7.

At 910, training data may be obtained, the training data at least comprising a first text, a first speaker ID, and a second text, a second speaker ID and style reference acoustic features corresponding to a style reference audio.

At 920, first transfer acoustic features may be generated, through the acoustic model, based at least on the first text, the first speaker ID and a first transfer style embedding vector, wherein the first transfer style embedding vector is generated by the style encoder based on the style reference acoustic features.

At 930, second transfer acoustic features may be generated, through a duplicate of the acoustic model, based at least on the second text, the second speaker ID and a second transfer style embedding vector, wherein the second transfer style embedding vector is generated by a duplicate of the style encoder based on the first transfer acoustic features.

At 940, cyclic reconstruction loss may be calculated with the style reference acoustic features and the second transfer acoustic features.

In an implementation, the first text and the first speaker ID may correspond to a speaker reference audio, and the training data may further comprise speaker reference acoustic features corresponding to the speaker reference audio.

In the foregoing implementation, the method 900 may further comprise: generating, through the acoustic model, first paired acoustic features based at least on the first text, the first speaker ID and a first speaker style embedding vector, wherein the first speaker style embedding vector is generated by an additional style encoder based on the speaker reference acoustic features; and calculating reconstruction loss with the speaker reference acoustic features and the first paired acoustic features. Further, the first text and the style reference acoustic features may be an unpaired input to the acoustic model, and the first text and the speaker reference acoustic features may be a paired input to the acoustic model.

In the foregoing implementation, the method 900 may further comprise: generating, through the duplicate of the acoustic model, second paired acoustic features based at least on the second text, the second speaker ID and a second speaker style embedding vector, wherein the second speaker style embedding vector is generated by a duplicate of the additional style encoder based on the style reference acoustic features; and calculating reconstruction loss with the style reference acoustic features and the second paired acoustic features. Further, the second text and the first transfer acoustic features may be an unpaired input to the duplicate of the acoustic model, and the second text and the style reference acoustic features may be a paired input to the duplicate of the acoustic model.

In an implementation, the style encoder may be a VAE or a GMVAE.

In an implementation, the style encoder may be obtained through an adversarial training for removing speaker information and retaining style information.

In an implementation, the style reference acoustic features may be a ground truth label for calculating the cyclic reconstruction loss.

In an implementation, the method 900 may further comprise, during applying the acoustic model: receiving an input comprising a target text, a target speaker ID and a target style reference audio, the target style reference audio corresponding to a text different from the target text and/or a speaker ID different from the target speaker ID; generating, through the style encoder, a style embedding vector based on the target style reference audio; and generating acoustic features based at least on the target text, the target speaker ID and the style embedding vector.

It should be understood that the method 900 may further comprise any step/process for training an acoustic model according to the embodiments of the present disclosure described above.

Figure 10:
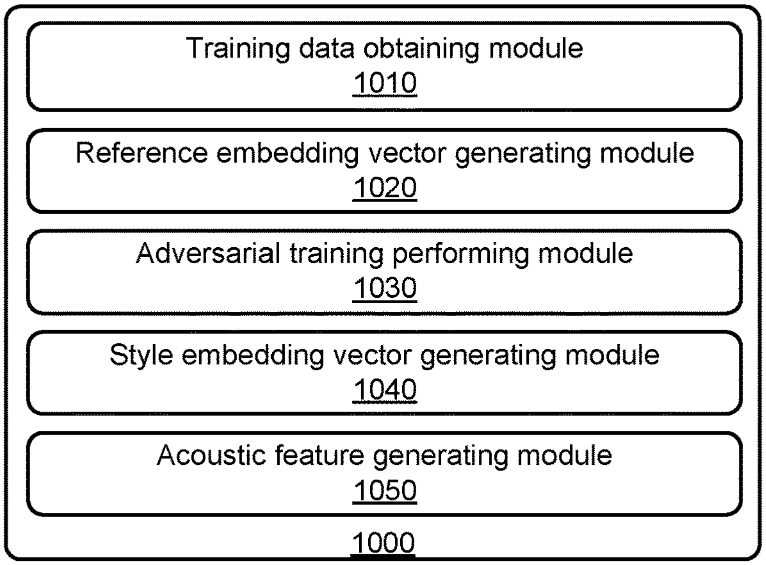
FIG. 10 illustrates an exemplary apparatus for training an acoustic model according to an embodiment.

FIG. 10 illustrates an exemplary apparatus 1000 for training an acoustic model according to an embodiment. The acoustic model may be for implementing cross-speaker style transfer and comprise at least a style encoder.

The apparatus 1000 may comprise: a training data obtaining module 1010, for obtaining training data, the training data comprising a text, a speaker ID, a style ID and acoustic features corresponding to a reference audio; a reference embedding vector generating module 1020, for generating, through the style encoder, a reference embedding vector based on the acoustic features; an adversarial training performing module 1030, for performing adversarial training to the reference embedding vector with at least the style ID and the speaker ID, to remove speaker information and retain style information; a style embedding vector generating module 1040, for generating, through the style encoder, a style embedding vector based at least on the reference embedding vector being performed the adversarial training; and an acoustic feature generating module 1050, for generating predicted acoustic features based at least on a state sequence corresponding to the text, a speaker embedding vector corresponding to the speaker ID, and the style embedding vector.

In an implementation, the adversarial training performing module 1030 may be for: generating, through a style classifier, a style classification result for the reference embedding vector; performing gradient reversal processing to the reference embedding vector; generating, through a speaker classifier, a speaker classification result for the reference embedding vector being performed the gradient reversal processing; and calculating a gradient back-propagation factor through a loss function, the loss function being based at least on a comparison result between the style classification result and the style ID and a comparison result between the speaker classification result and the speaker ID.

In an implementation, the style embedding vector generating module 1040 may be for: generating, through a full connection layer in the style encoder, the style embedding vector based at least on the reference embedding vector being performed the adversarial training, or based at least on the reference embedding vector being performed the adversarial training and the style ID.

In an implementation, the style embedding vector generating module 1040 may be for: generating, through a second full connection layer in the style encoder, the style embedding vector based at least on the style ID, or based at least on the style ID and the speaker ID.

In an implementation, the style embedding vector may correspond to a prior distribution or a posterior distribution of a latent variable having Gaussian distribution or Gaussian mixture distribution.

Moreover, the apparatus 1000 may further comprise any other module that performs the steps of the methods for training an acoustic model (e.g., the method 800 in FIG. 8, etc.) according to the embodiments of the present disclosure described above.

Figure 11:
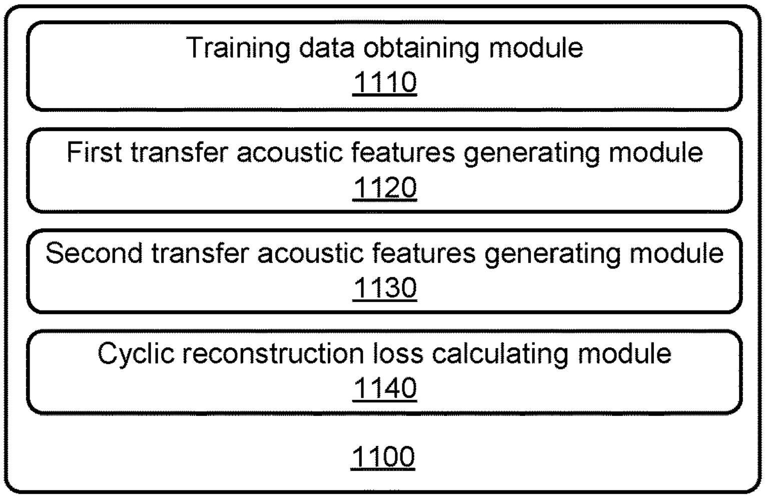
FIG. 11 illustrates an exemplary apparatus for training an acoustic model according to an embodiment.

FIG. 11 illustrates an exemplary apparatus 1100 for training an acoustic model according to an embodiment. The acoustic model may be for implementing cross-speaker style transfer and comprise at least a style encoder.

The apparatus 1100 may comprise: a training data obtaining module 1110, for obtaining training data, the training data at least comprising a first text, a first speaker ID, and a second text, a second speaker ID and style reference acoustic features corresponding to a style reference audio; a first transfer acoustic features generating module 1120, for generating, through the acoustic model, first transfer acoustic features based at least on the first text, the first speaker ID and a first transfer style embedding vector, wherein the first transfer style embedding vector is generated by the style encoder based on the style reference acoustic features; a second transfer acoustic features generating module 1130, for generating, through a duplicate of the acoustic model, second transfer acoustic features based at least on the second text, the second speaker ID and a second transfer style embedding vector, wherein the second transfer style embedding vector is generated by a duplicate of the style encoder based on the first transfer acoustic features; and a cyclic reconstruction loss calculating module 1140, for calculating cyclic reconstruction loss with the style reference acoustic features and the second transfer acoustic features.

In an implementation, the first text and the first speaker ID may correspond to a speaker reference audio, and the training data may further comprise speaker reference acoustic features corresponding to the speaker reference audio.

In the foregoing implementation, the apparatus 1100 may further comprise: a first paired acoustic features generating module, for generating, through the acoustic model, first paired acoustic features based at least on the first text, the first speaker ID and a first speaker style embedding vector, wherein the first speaker style embedding vector is generated by an additional style encoder based on the speaker reference acoustic features; and a reconstruction loss calculating module, for calculating reconstruction loss with the speaker reference acoustic features and the first paired acoustic features. Further, the first text and the style reference acoustic features may be an unpaired input to the acoustic model, and the first text and the speaker reference acoustic features may be a paired input to the acoustic model.

In the foregoing implementation, the apparatus 1100 may further comprise: a second paired acoustic features generating module, for generating, through the duplicate of the acoustic model, second paired acoustic features based at least on the second text, the second speaker ID and a second speaker style embedding vector, wherein the second speaker style embedding vector is generated by a duplicate of the additional style encoder based on the style reference acoustic features; and a reconstruction loss calculating module, for calculating reconstruction loss with the style reference acoustic features and the second paired acoustic features. Further, the second text and the first transfer acoustic features may be an unpaired input to the duplicate of the acoustic model, and the second text and the style reference acoustic features may be a paired input to the duplicate of the acoustic model. Further, the style encoder may be a VAE or a GMVAE. Further, the style encoder may be obtained through an adversarial training for removing speaker information and retaining style information. Further, the style reference acoustic features may be a ground truth label for calculating the cyclic reconstruction loss.

Moreover, the apparatus 1100 may further comprise any other module that performs the steps of the methods for training an acoustic model (e.g., the method 900 in FIG. 9, etc.) according to the embodiments of the present disclosure described above.

Figure 12:
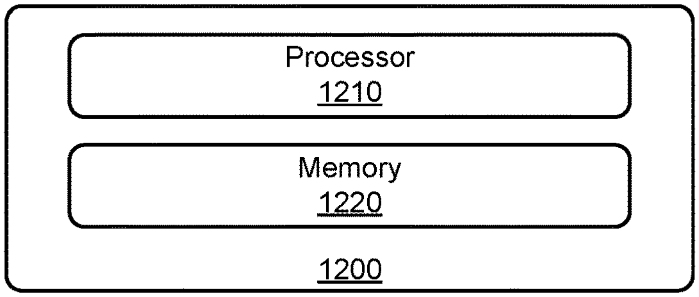
FIG. 12 illustrates an exemplary apparatus for training an acoustic model according to an embodiment.

FIG. 12 illustrates an exemplary apparatus 1200 for training an acoustic model according to an embodiment. The acoustic model may be for implementing cross-speaker style transfer and comprise at least a style encoder.

The apparatus 1200 may comprise: at least one processor 1210; and a memory 1220 storing computer-executable instructions that, when executed, cause the at least one processor 1210 to perform any step/process of the methods for training an acoustic model (e.g., the method 800 in FIG. 8, the method 900 in FIG. 9, etc.) according to the embodiments of the present disclosure described above.

The embodiments of the present disclosure may be embodied in a non-transitory computer-readable medium. The non-transitory computer-readable medium may comprise instructions that, when executed, cause one or more processors to perform any operations of the methods for training an acoustic model according to the embodiments of the present disclosure described above.

It should be understood that all the operations in the methods described above are merely exemplary, and the present disclosure is not limited to any operations in the methods or sequence orders of these operations, and should cover all other equivalents under the same or similar concepts.

It should also be understood that all the modules in the apparatuses described above may be implemented in various approaches. These modules may be implemented as hardware, software, or a combination thereof. Moreover, any of these modules may be further functionally divided into sub-modules or combined together.

Processors are described in connection with various apparatus and methods. These processors may be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, etc. Software may reside on computer readable medium. Computer readable medium may include, e.g., a memory, which may be, e.g., a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for training an acoustic model, the acoustic model being for implementing cross-speaker style transfer and comprising at least a style encoder comprising a convolutional neural network (CNN) and a long short-term memory (LSTM) network, the method comprising:

obtaining training data, the training data comprising a text, a speaker identity (ID), a style ID and acoustic features corresponding to a reference audio;

generating, through the style encoder comprising a convolutional neural network (CNN) and a long short-term memory (LSTM) network, a reference embedding vector of at least 128 dimensions based on the acoustic features;

performing adversarial training to the reference embedding vector with at least the style ID and the speaker ID, to remove speaker information and retain style information, wherein the adversarial training comprises:

generating, through a style classifier comprising multiple neural network layers, a style classification result comprising probability distributions over a plurality of style categories for the reference embedding vector;

performing gradient reversal processing to the reference embedding vector by multiplying gradients computed during backpropagation by a negative scaling factor;

generating, through a speaker classifier comprising multiple neural network layers, a speaker classification result comprising probability distributions over a plurality of speaker identities for the reference embedding vector being performed the gradient reversal processing; and calculating a gradient back-propagation factor through a loss function by computing partial derivatives across the multiple neural network layers of the style classifier and the speaker classifier, the loss function being based at least on a comparison result between the style classification result and the style ID and a comparison result between the speaker classification result and the speaker ID;

generating, through the style encoder, a style embedding vector based at least on the reference embedding vector being performed the adversarial training; and generating predicted acoustic features based at least on a state sequence corresponding to the text, a speaker embedding vector corresponding to the speaker ID, and the style embedding vector.

2. The method of claim 1, wherein the generating the reference embedding vector comprises:

generating the reference embedding vector based on the acoustic features through a Convolutional Neural Network (CNN) and a Long Short-Term Memory (LSTM) network in the style encoder.

3. The method of claim 1, wherein the adversarial training is performed by a Domain Adversarial Training (DAT) module.

4. The method of claim 1, wherein the generating a style embedding vector comprises:

generating, through a full connection layer in the style encoder, the style embedding vector based at least on the reference embedding vector being performed the adversarial training, or based at least on the reference embedding vector being performed the adversarial training and the style ID.

5. The method of claim 4, wherein the generating a style embedding vector comprises:

generating, through a second full connection layer in the style encoder, the style embedding vector based at least on the style ID, or based at least on the style ID and the speaker ID.

6. The method of claim 1, wherein the style encoder is a Variational Auto Encoder (VAE) or a Gaussian Mixture Variational Auto Encoder (GMVAE).

7. The method of claim 1, wherein the style embedding vector corresponds to a prior distribution or a posterior distribution of a latent variable having Gaussian distribution or Gaussian mixture distribution.

8. The method of claim 1, further comprising:

obtaining a plurality of style embedding vectors corresponding to a plurality of style IDs respectively, or obtaining a plurality of style embedding vectors corresponding to a plurality of combinations of style ID and speaker ID respectively, through training the acoustic model with a plurality of training data.

9. The method of claim 1, further comprising:

encoding the text into the state sequence through a text encoder in the acoustic model; and generating the speaker embedding vector through a speaker look up table (LUT) in the acoustic model, and the generating predicted acoustic features comprises:

extending the state sequence with the speaker embedding vector and the style embedding vector;

generating, through an attention module in the acoustic model, a context vector based at least on the extended state sequence; and generating, through a decoder in the acoustic model, the predicted acoustic features based at least on the context vector.

10. The method of claim 1, further comprising: during applying the acoustic model, receiving an input, the input comprising a target text, a target speaker ID, and a target style reference audio and/or a target style ID;

generating, through the style encoder, a style embedding vector based at least on acoustic features of the target style reference audio and/or the target style ID; and generating acoustic features based at least on the target text, the target speaker ID and the style embedding vector.

11. The method of claim 10, wherein the input further comprises a reference speaker ID, and the generating a style embedding vector is further based on the reference speaker ID.

12. The method of claim 1, further comprising: during applying the acoustic model, receiving an input, the input comprising a target text, a target speaker ID, and a target style ID;

selecting, through the style encoder, a style embedding vector from a plurality of predetermined candidate style embedding vectors based at least on the target style ID; and generating acoustic features based at least on the target text, the target speaker ID and the style embedding vector.

13. At least one non-transitory machine-readable medium including instructions for training an acoustic model for implementing cross-speaker style transfer using at least a style encoder comprising a convolutional neural network (CNN) and a long short-term memory (LSTM) network that, when executed by at least one processor, cause the at least one processor to perform operations to:

obtain training data, the training data comprising a text, a speaker identity (ID), a style ID and acoustic features corresponding to a reference audio;

generate, through the style encoder comprising a convolutional neural network (CNN) and a long short-term memory (LSTM) network, a reference embedding vector of at least 128 dimensions based on the acoustic features;

perform adversarial training to the reference embedding vector with at least the style ID and the speaker ID, to remove speaker information and retain style information, wherein the adversarial training comprises:

generating, through a style classifier comprising multiple neural network layers, a style classification result comprising probability distributions over a plurality of style categories for the reference embedding vector;

performing gradient reversal processing to the reference embedding vector by multiplying gradients computed during backpropagation by a negative scaling factor;

generating, through a speaker classifier comprising multiple neural network layers, a speaker classification result comprising probability distributions over a plurality of speaker identities for the reference embedding vector being performed the gradient reversal processing; and calculating a gradient back-propagation factor through a loss function by computing partial derivatives across the multiple neural network layers of the style classifier and the speaker classifier, the loss function being based at least on a comparison result between the style classification result and the style ID and a comparison result between the speaker classification result and the speaker ID;

generate, through the style encoder, a style embedding vector based at least on the reference embedding vector being performed the adversarial training; and generate predicted acoustic features based at least on a state sequence corresponding to the text, a speaker embedding vector corresponding to the speaker ID, and the style embedding vector.

14. An apparatus for training an acoustic model, the acoustic model being for implementing cross-speaker style transfer and comprising at least a style encoder comprising a convolutional neural network (CNN) and a long short-term memory (LSTM) network, the apparatus comprising:

at least one processor; and a memory storing computer-executable instructions that, when executed, cause the at least one processor to:

obtain training data, the training data comprising a text, a speaker identity (ID), a style ID and acoustic features corresponding to a reference audio, generate, through the style encoder comprising a convolutional neural network (CNN) and a long short-term memory (LSTM) network, a reference embedding vector of at least 128 dimensions based on the acoustic features, perform adversarial training to the reference embedding vector with at least the style ID and the speaker ID, to remove speaker information and retain style information, wherein the adversarial training comprises:

generating, through a style classifier comprising multiple neural network layers, a style classification result comprising probability distributions over a plurality of style categories for the reference embedding vector;

performing gradient reversal processing to the reference embedding vector by multiplying gradients computed during backpropagation by a negative scaling factor;

generating, through a speaker classifier comprising multiple neural network layers, a speaker classification result comprising probability distributions over a plurality of speaker identities for the reference embedding vector being performed the gradient reversal processing; and calculating a gradient back-propagation factor through a loss function by computing partial derivatives across the multiple neural network layers of the style classifier and the speaker classifier, the loss function being based at least on a comparison result between the style classification result and the style ID and a comparison result between the speaker classification result and the speaker ID;

generate, through the style encoder, a style embedding vector based at least on the reference embedding vector being performed the adversarial training, and generate predicted acoustic features based at least on a state sequence corresponding to the text, a speaker embedding vector corresponding to the speaker ID, and the style embedding vector.

15. The apparatus of claim 14, the instructions to generate the reference embedding vector further comprising instructions to generate the reference embedding vector based on the acoustic features through a Convolutional Neural Network (CNN) and a Long Short-Term Memory (LSTM) network in the style encoder.

16. The apparatus of claim 14, wherein the adversarial training is performed by a Domain Adversarial Training (DAT) module.

17. The apparatus of claim 14, the instructions to generate a style embedding vector further comprising instructions to generate, through a full connection layer in the style encoder, the style embedding vector based at least on the reference embedding vector being performed the adversarial training, or based at least on the reference embedding vector being performed the adversarial training and the style ID.

18. The apparatus of claim 17, the instructions to generate a style embedding vector further comprising instructions to generate, through a second full connection layer in the style encoder, the style embedding vector based at least on the style ID, or based at least on the style ID and the speaker ID.

19. The at least one non-transitory machine-readable medium of claim 13, the instructions to generate the reference embedding vector further comprising instructions to generate the reference embedding vector based on the acoustic features through a Convolutional Neural Network (CNN) and a Long Short-Term Memory (LSTM) network in the style encoder.

20. The at least one non-transitory machine-readable medium of claim 13, wherein the adversarial training is performed by a Domain Adversarial Training (DAT) module.

* * * * *